United States Patent Office 2,893,883
Patented July 7, 1959

2,893,883

DEFOAMER MATERIALS

John Thomas Stephan, Seattle, Wash.

No Drawing. Application February 7, 1955
Serial No. 486,721

15 Claims. (Cl. 106—124)

This invention relates to improved compositions of matter useful in the prevention of foaming in various aqueous adhesive solutions.

Particularly this invention relates to the use of tri-alkoxy-phosphates either alone or in combination with other materials, such as a spreader oil, as a defoaming agent in regulating the foaming of amino resin solutions, such as urea resin or melamine resin and the like, phenolic resin solutions, and various combinations thereof with cereal flours, blood albumen, finely comminuted wood flour or nutshell flour and the like. The use of these defoamer materials in urea resin adhesives extended with wheat flour with or without additional soluble blood albumen is particularly effective.

The use of tri-butyl phosphate as a defoaming agent is well known and has had some commercial use. One difficulty with tri-butyl phosphate is its appreciable volatility and low viscosity. These are factors which influence the ability of a defoamer material to remain with a fine flour when dry mixed and stored in stacks or drums prior to mixing with water for ultimate use.

I have found that tri-alkoxy-phosphates such as tributoxy-ethyl phosphate, tri-amyloxy-ethyl phosphate, tri-2-ethyl hexyloxy-ethyl phosphate, tri-butoxy-propyl-phosphate, tripropoxy-propyl-phosphate and the like make exceptional defoaming agents. The unusual effectiveness of these materials may be attributed to the presence of ether linkages in the alkoxy groups. The alkoxy groups impart a kind of dual nature to the hydrocarbon chain since the hydrocarbon chain is pronouncedly hydrophobic. Apparently this combination makes for a better adsorption at the air-liquid interface which in turn probably regulates the foaming tendency of the solution.

The tri-alkoxy-phosphates may be prepared in conventional manner by the reaction of phosphorous oxychloride and the corresponding alcohols. Butoxy-ethanol (butyl cellosolve) for example produces tri-butoxy-ethyl phosphate on reaction with phosphorus oxychloride.

The tri-alkoxy-phosphates are for the most part alkali stable high boiling liquids of correspondingly low volatility.

The tri-alkoxy-phosphates are so efficient as defoaming agents that they can be advantageously extended with inexpensive hydrocarbon oil solvents or the like. Since they are stable water immiscible liquids they can be emulsified in water and added to either the solid phase material or to be dispersed in water or alternately to the water in which the solid phase material is to be dispersed. They are useful over a wide range of both acid and alkaline pH.

The tri-alkoxy-phosphates are effective in concentrations between 0.02% and 0.5% by weight of the total mixture. Where a tri-alkoxy-phosphate is used as a component of a blend of oils, the ratio of tri-alkoxy-phosphates to the oil solvent such as pale oil, diesel oil, olive oil, petroleum, or the like, is not critical. A mixture of 10# of tri-butoxy-phosphate and 90# of diesel oil is more effective than steam distilled pine oil in defoaming wheat flour extended urea resins when compared on a comparable weight basis. This is an important discovery since the supply of pine oil is diminishing as a result of the extensive cutting of the Southern pine forests in recent years.

Many different oils may be utilized as spreaders to increase the contact of the tri-alkoxy-phosphate with the material or solution to be defoamed. It is not necessary that the oil be a hydrocarbon oil although such an oil is usually the least expensive. While oils are preferred, greases and other water insoluble materials exhibiting plastic flow may be used. The following incomplete list of suitable spreading agents is not intended to be limiting but to illustrate the variety of spreaders which have utility. Useful spreaders are, petroleum distillates, pine oil, natural oils such as olive oil, neat's-foot oil, chlorinated hydrocarbons such as those known as "Arochlors" which are available commercially from the Monsanto Chemical Co., of St. Louis, Mo., synthetic oily or hydrophobic materials which may be of a polymeric nature such as "Dutrex" of Shell Oil Co., water insoluble alcohols, ketones and esters, and the like.

*Example 1*

A urea resin syrup was prepared according to the following procedure.

1000# of 37% formaldehyde solution were introduced into a stainless steel resin kettle equipped with a reflux condenser and a V type stirrer and 6.6# of tri-ethanolamine were added together with 336# of urea. The pH was 8.1 when measured at 70° F. with a glass electrode and a Coleman Model 3D pH meter. The solution was heated to reflux and refluxed at atmospheric pressure for 20 minutes. The solution was then cooled to 170° F. and 6 N sulfuric acid added to a pH of 5.2. This required 0.95# of acid. The solution was then heated and held at 190° F. until a sample removed and cooled to 70° F. had a viscosity of 100 centipoises when measured with a Brookfield viscosimeter. The solution was then cooled to 180° F. and held there until a sample removed and cooled to 70° F. had a viscosity of 500 cps. The solution was then cooled to 160° F. and held there until a sample removed and cooled to 70° F. had a viscosity of 950 centipoises. At this point sufficient 6 N sodium hydroxide was added to give a pH of 7.5 @ 70° F. This amounted to 0.95# of 6 N sodium hydroxide. The solution was then rapidly cooled to 70° F. and used in making a hotpress plywood adhesive as follows: 320 grams of the resin solution (viscosity 985 centipoises) were placed in a double beater kitchen mixer and 4.6 grams of a mixture containing 15.0% by weight of tripropoxy-propyl-phosphate in pale oil were added together with 4 grams of ammonium chloride catalyst and 185 grams of 70° F. water. These ingredients were mixed 3 minutes and then 30 grams of soluble blood albumen were added and mixed 3 minutes. 125 grams of wheat flour were added and mixed about 3 minutes until smooth. 100 grams of 70° F. water were then added and mixed 3 minutes. The specific gravity of the wet mix adhesive was 1.12. 500 grams of the wet mix adhesive were placed in a laboratory foam machine which is designed to test a glue composition as to its foaming tendency or ability. This foam testing machine consists of a steel roll 8.5" in diameter and 6.5" long rotating at 144 r.p.m. in an attached wedge-shaped hopper. The total capacity of the hopper was 1200 cc. The gap or slit where the hopper and the roll almost come in contact is 0.030" wide. The action of the rotating roll is to drag glue through the slit and around into the upper part of the hopper, thus causing the glue in the hopper to entrain air as it rolls in contact with the revolving roll. A normal glue will usually have a specific gravity @ 70° F.

of between 1.00 and 1.15 when freshly mixed. After the glue has been subjected to 30 minutes of foaming on the foam machine, the specific gravity is measured and the difference in specific gravity between the foamed and unfoamed glue is a measure of the foaming tendency of the glue. A urea resin adhesive mixed exactly as in Example 1 with the exception that no defoamer was used had a specific gravity after initial mixing of 1.08 and after 30 minutes on the foam machine it had a specific gravity of 0.56. Under identical conditions the glue of Example 1 had a specific gravity after initial mixing of 1.12 and after 30" on the foam machine of 0.80. This demonstrates the remarkable effectiveness of my defoamer composition.

*Example 2*

307 grams of Casco Urea Resin #7 (obtained from the Borden Company, Seattle, Washington) was mixed with 4.6 grams of a defoamer consisting of 10% by weight of tri-butoxy-ethyl phosphate dissolved in diesel oil together with 6.15 grams of Casco Urea Resin Catalyst H-71 and 184 grams of water for 3 minutes. 30.7 grams of soluble blood albumen (obtained from Armour & Co., Chicago, Illinois) were added and mixed 3 minutes. 123 grams of "Balzie" wheat flour (obtained from Fisher Flouring Mills, Seattle, Washington) were added and mixed until smooth, whereupon 98 grams of 70° F. water were added and mixed 3 minutes. The specific gravity of this glue mix was 1.14, after a 531 gram sample had been run, 10' on the foam machine it had a specific gravity of 0.95, after 20' on the foam machine it had a specific gravity of 0.88; and after 30' a specific gravity of 0.81.

A similar glue mix except substituting 4.7 grams of pine oil (Yarmor 302) obtained from Hercules Powder Co., Wilmington, Delaware, showed a specific gravity after initial mixing of 114; after 10' on the foam machine it showed a specific gravity of 0.82, after 20' a specific gravity of 0.75 and after 30' a specific gravity of 0.72.

This demonstrates the efficiency of my defoamer compared to pine oil.

While the foregoing examples demonstrate the effectiveness of the use of tri-alkoxy-phosphates in the defoaming of urea resin adhesives, I do not wish to be limited by these examples since tri-alkoxy-phosphates are useful in defoaming a wide variety of solutions such as alkaline soybean plywoood adhesives, casein glues, soybean, and casein, and starch paper coating and sizes, alkaline phenol-formaldehyde resin solutions used in the consolidation of cellulosic fibres into hardboard; and the like. Other resin solutions such as melamine formaldehyde solution, polyvinyl acetate emulsion and the like are defoamed by tri-alkoxy-phosphates. A solution of tri-butoxy-ethyl phosphate in diesel oil is particularly effective in controlling foam in alkaline soybean plywood adhesives containing pentachlorophenol preservative.

I claim:

1. A defoamer composition for abatement of foam in an aqueous adhesive solution, said composition comprising a tri-alkoxy-phosphate having only one ether-oxygen linkage and at least six carbon atoms in each side chain, said tri-alkoxy-phosphate being dissolved in a water insoluble, substantially non-volatile hydrocarbon oil solvent therefor.

2. An aqueous adhesive solution resistant to foaming, having in composition with such solution a defoamer containing an effective amount of a tri-alkoxy-phosphate having only one ether-oxygen linkage and at least six carbon atoms in each side chain.

3. A composition according to claim 2, wherein said tri-alkoxy-phosphate is selected from the group consisting of tri-butoxy ethyl phosphate, tri-amyloxy-ethyl phosphate, tri-2-ethyl hexyloxy-ethyl phosphate, tri-butoxy-propyl phosphate, and tri-propoxy-propyl phosphate.

4. A composition according to claim 2, where said tri-alkoxy-phopshate is present in solution with a water insoluble, substantially non-volatile organic solvent.

5. A composition according to claim 2, wherein said aqueous adhesive solution is selected from the group consisting of resin-base adhesives and protein-base adhesives.

6. A composition according to claim 2, wherein said aqueous adhesive solution is an alkaline, protein-base adhesive.

7. A composition according to claim 2, wherein said tri-alkoxy-phosphate is present in said aqueous adhesive solution in a concentration of from 0.02% to 0.5% by weight.

8. A composition according to claim 4, wherein said water insoluble, substantially non-volatile organic solvent is selected from the group consisting of petroleum distillate, pale oil, pine oil, olive oil, neat's-foot oil, chlorinated hydrocarbons, synthetic polymeric oils, water insoluble alcohols, water insoluble ketones, and water insoluble esters.

9. A composition according to claim 4, wherein said tri-alkoxy-phosphate and said organic solvent are present in a relative proportion of about 1 to 9 by weight.

10. A composition according to claim 5, further containing a proteinaceous extender selected from the group consisting of cereal flours, blood albumen, finely comminuted wood flour, and nutshell flour.

11. A composition according to claim 6, wherein said alkaline, protein-base adhesive further contains pentachlorophenol as a preservative.

12. A defoamed composition comprising an aqueous solution selected from the group consisting of protein-base adhesive solutions and resin-base adhesive base solutions, said solution having in composition therewith a defoamer, said defoamer consisting essentially of an alkali stable, high boiling point, water immiscible tri-alkoxy-phosphate dissolved in a water insoluble, substantially non-volatile, liquid organic solvent serving as a vehicle and spreader therefor, said tri-alkoxy-phosphate having only one ether-oxygen linkage and at least six carbon atoms in each side chain.

13. A defoamed composition according to claim 12, wherein said aqueous adhesive solution is an alkaline soybean plywood adhesive containing pentachlorophenol preservative.

14. A defoamed composition according to claim 12, wherein said defoamer is tri-butoxy-ethyl phosphate.

15. A defoamed composition according to claim 12, wherein said organic solvent is diesel oil.

References Cited in the file of this patent

UNITED STATES PATENTS

| | | |
|---|---|---|
| 1,944,530 | Schonburg | Jan. 23, 1934 |
| 2,411,671 | Smith | Nov. 26, 1946 |
| 2,452,693 | Smith | Nov. 2, 1948 |
| 2,723,237 | Ferrin | Nov. 8, 1955 |
| 2,746,878 | Rush | May 22, 1956 |